United States Patent [19]

Satomi

[11] Patent Number: 4,714,354

[45] Date of Patent: Dec. 22, 1987

[54] SUPPORT DEVICE FOR TRAVEL ASSEMBLY

[75] Inventor: Toyokazu Satomi, Yokohama, Japan

[73] Assignee: Ricoh Company, Ltd., Tokyo, Japan

[21] Appl. No.: 811,730

[22] Filed: Dec. 20, 1985

[30] Foreign Application Priority Data

Dec. 29, 1984 [JP] Japan .................. 59-276672
Dec. 29, 1984 [JP] Japan .................. 59-276673

[51] Int. Cl.⁴ .............................................. F16C 29/00
[52] U.S. Cl. ........................................ 384/38; 384/42
[58] Field of Search .............. 384/7, 10, 25, 26, 37, 384/38, 40, 41, 42, 50, 53, 52, 54, 57, 55

[56] References Cited

FOREIGN PATENT DOCUMENTS 2527965 12/1983 France .................. 384/40
181949 12/1979 Japan .
10845 3/1980 Japan .
121430 9/1980 Japan .
25216 6/1982 Japan .
506266 5/1939 United Kingdom .................. 384/10

Primary Examiner—Stuart S. Levy
Assistant Examiner—David Werner
Attorney, Agent, or Firm—Cooper, Dunham, Griffin & Moran

[57] ABSTRACT

A support device for supporting on a guide shaft a travel assembly moving along the guide shaft, comprising at least two sliding bearings equipped with V shaped grooves, and separate bearings disposed opposite the respective sliding bearings across the guide shaft. The support device supports the travel assembly on the guide shaft by pinching the guide shaft between the sliding bearings and the separate bearings.

3 Claims, 12 Drawing Figures

SUPPORT DEVICE FOR TRAVEL ASSEMBLY

FIELD OF THE INVENTION

This invention relates to a support device which supports on a shaft a travel assembly moving along the guide shaft.

This travel assembly is used when moving an exposure optical system which is designed to expose and scan an original document in the original reader for printers and so on, or when similarly moving an exposure optical system in a copying machine.

RELATED ART STATEMENT

Heretofore, such various supports for the travel assembly have been proposed as follows:

According to Japanese Utility Model Laid-Open Publication No. Sho-54-181949, as shown in FIG. 8, the travel assembly is supported on a guide shaft 104 by sliding bearings 102 and 103 on one side, and at the same time on another guide shaft 106 through rollers 105 on the other side. This way of supporting is common, but necessitates clearances on the order of 0.02 to 0.08 mm between the sliding bearings 102 and 103 and the guide shaft 104 to move the travel assembly 101. While a wire 107 is pulling the travel assembly, the assembly can move by the amount of the above clearances, thus creating a fluctuation of travel speed and a degree of vibration. To avoid this, FIG. 8 employs a spring 108 and another wire 109 to push the travel assembly toward the direction of advance to compensate for the play. This method, however, has the disadvantage that a large amount of running resistance must be overcome.

Japanese Patent Laid-Open Publication No. Sho-55-121430 employs a magnet instead of the spring 108 and the wire 109 in FIG. 8, in which the magnetic force of the magnet again presses the travel assembly in the direction of advance in order to reduce play. This method also produces a fairly large amount of running resistance.

According to Japanese Utility Model Publication No. Sho-57-10845, as shown in FIG. 9, the travel assembly is supported on a guide shaft 104 by a so-called double-cone type roller 110 and another roller 111 on its one side (left), and on the other guide shaft 106 by the other rollers 112 on the other side (right). The roller 111 is pushed against the guide shaft 104 by a spring or the like (not shown).

This method uses the double-cone type roller 110, which permits the clearance between the guide shaft 104 and the rollers 110 and 111 to be reduced nearly to zero, thus reducing running resistance. The position of the travel assembly, however, may shift as the rollers wear, or noise may be raised as the rollers rotate.

According to Japanese Utility Model Publication No. Sho-57-25216, as shown in FIG. 11, the travel assembly 101 is provided with two V-shape type sliding bearings 113 on its one side, and supported on a guide shaft 104 by these V-shape type bearings and a roller 114. The system is illustrated in FIG. 11.

In this figure, pulling a wire 107 in the direction of A or B allows the travel assembly 101 to be moved respectively in the direction of AA or BB along the guide shaft 104. In short, this method causes the travel assembly 101 to be supported at three points by the roller 114 and the V-shape grooves 115 on the bearings 113.

With this kind of support device, when the wire 107 is pulled, a force couple is applied to the travel assembly 101, which cause the assembly to float up from the guide shaft 104. For instance, when the wire is pulled in the direction of A, a force couple Ma acts on the travel assembly 101, which in turn causes the groove 115 on the right side to slide against the guide shaft 104. As shown in FIG. 12, the force couple exerts such a force on the assembly that the groove 115 on the right side is pushed out in the direction of S, which causes the right-side slope of the right groove 115 to ride on the guide shaft 104, thus resulting in the travel assembly 101 floating up in the direction of T or upward in the drawing.

When using the travel assembly for copy scanning by means of an exposure optical system, such a float-up of the travel assembly as described above can cause difficulties because of the inability to accurately position the requisite optical image.

OBJECT AND SUMMARY OF THE INVENTION

In view of the above, it is the object and purpose of the invention to provide a support device for a travel assembly which can keep the travel assembly from floating up from a guide shaft and can allow smooth travel.

In a support device for supporting on a guide shaft a travel assembly which moves along the guide shaft, the aforesaid object can be accomplished by providing at least two first bearings having V-shape grooves fixedly secured on the travel assembly, and slidably in contact with the guide shaft as well as second bearings also fixedly secured to the travel assembly, and disposed respectively oppositely to at least two of the first bearings across the guide shaft.

BRIEF DESCRIPTION OF THE DRAWINGS

In the accompanying drawings, there are shown illustrative embodiments of the invention from which these and other of its objectives, novel features and advantages will be readily apparent.

In the drawings.

DETAILED DESCRIPTION OF THE PREFERRED EMBODIMENTS

Figure 7:
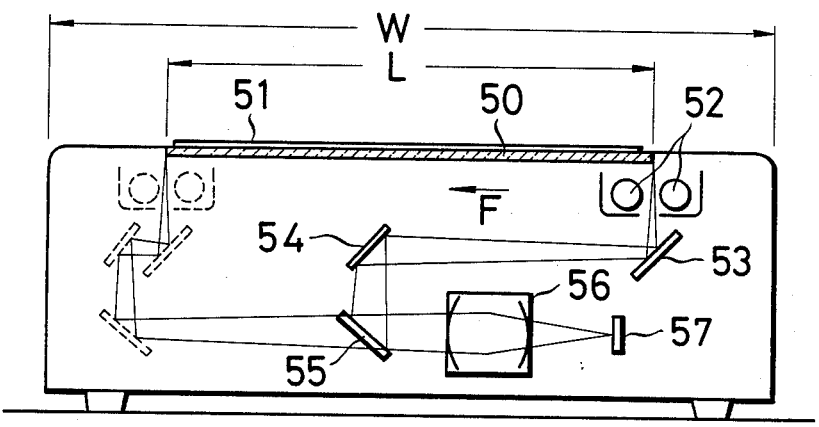
FIG. 7 is a sectional side view of a document reader, an example of machines using the travel assembly and its support device.
Figure 9:
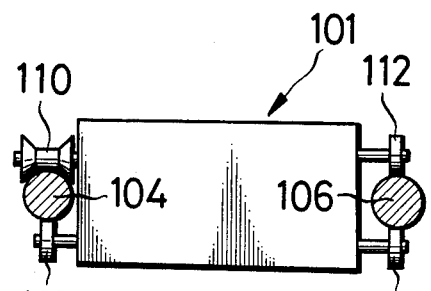
FIG. 9 is a sectional side view of another example of the related art.
Figure 8:
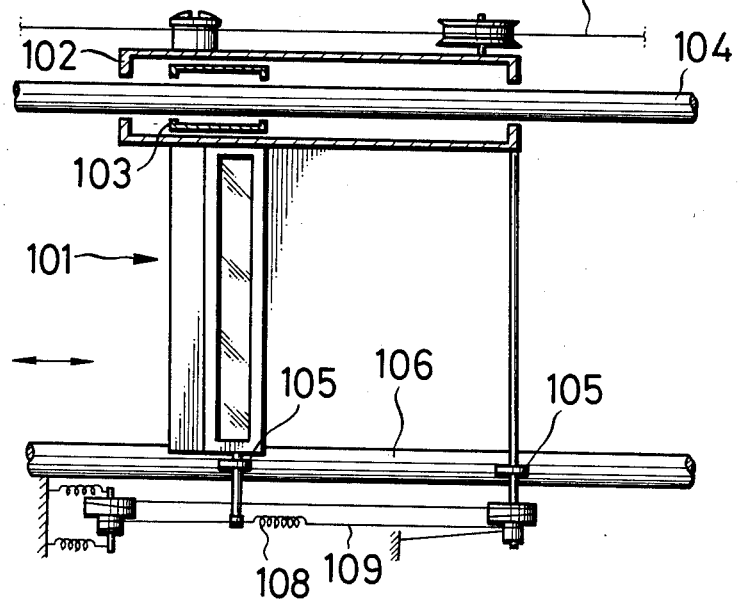
FIG. 8 is a plan view of an example of the related art.
Figure 10:
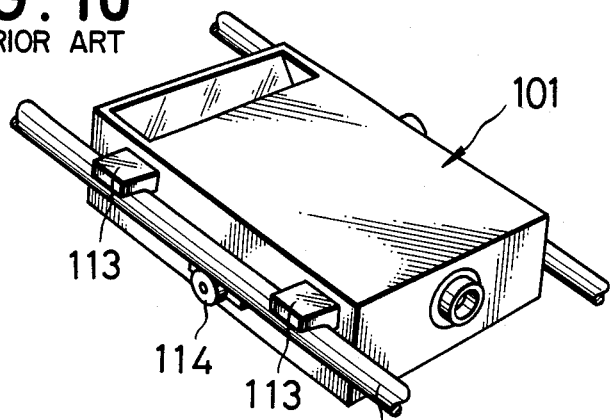
FIG. 10 is a perspective view of a further example of the related art.

FIG. 7 is a sectional side view of an example of a document reader using a support device of a travel assembly according to the invention.

In this device, the beam of the reflected image produced by illuminating by lamps 52 an original document 51 placed on a glass document support member 50 is projected to form the image on a line sensor 57 through a first mirror 53, a second mirror 54, a third mirror 55, and a lens 56, and the original image is read by the line sensor 57 using a so-called CCD (charge coupled device) or the like.

When reading the original 51, the lamps 52 and the first mirror 53 travel together as a unit, in the direction of F shown by the arrow, from the positions shown by the full lines in the figure. At the same time, the second mirror 54 and the third mirror 55 also travel together as one piece in the direction of F shown by the arrow similarly but at half the speed. Therefore, the lamps 52 and the mirrors 53 to 55 respectively arrive at the relative positions shown by broken lines in the figure.

The sub-scan for the original 51 is performed by the travel of the lamps 52 and the respective mirrors 53 to 55 in the direction of F, and the main-scan thereof is accomplished by the self-scan of the line sensor 57, which results in reading of the original 51 in two dimensional state by the line sensor 57 to be converted into electric signals.

Figure 1:
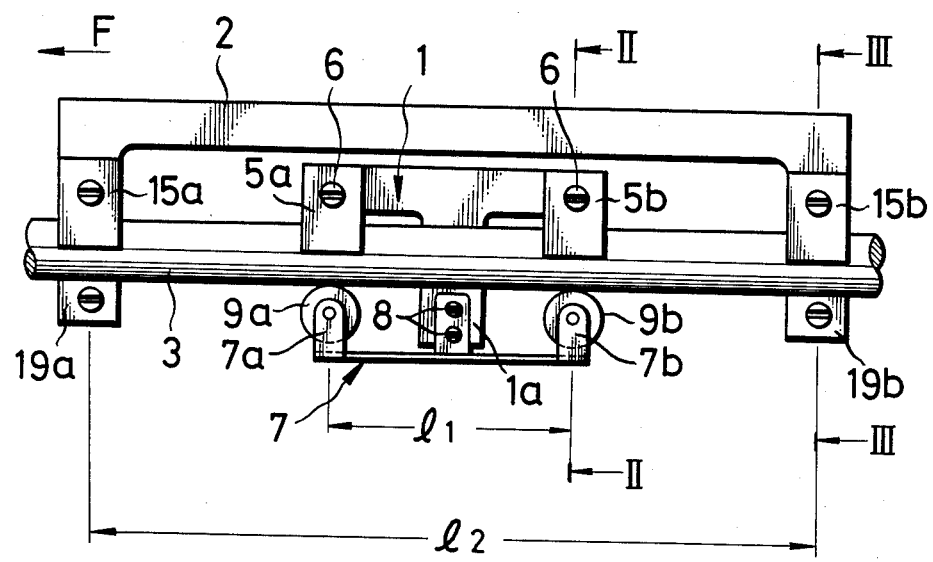
FIG. 1 is a side view which shows two different embodiments according to the invention.

As mentioned above, the lamps 52 and the mirrors 53 to 55 travel of sub-scan for the original 51, and a first travel assembly 1 in FIG. 1 is dedicated to the travel of the lamps 52 and the first mirror 53, while a second travel assembly 2 in FIG. 1 is dedicated to the travel of the second and third mirrors 54 and 55. Because the lamps 52 and the first mirror 53 travel twice as fast as the second and third mirrors 54 and 55, the first travel assembly 1 travels faster than the second travel assembly 2, which results in the change of the relative disposition of the first travel assembly 1 and the second travel assembly 2 within the end limits of the second travel assembly 2. In this connection, the direction F shown by the arrow in FIG. 1 is the same as shown by the like reference sign in FIG. 7.

Both of the first travel assembly 1 and the second travel assembly 2 are provided with supports representing embodiments according to the invention, which are different from each other. From now on, each of the embodiments is separately described.

Figure 2:
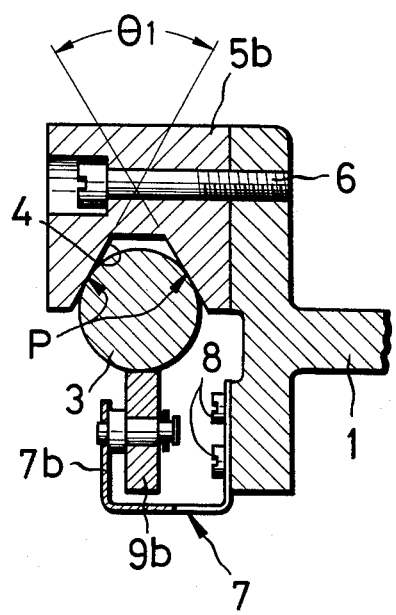
FIG. 2 is a sectional view of FIG. 1 taken along line II—II.

First, as shown in FIG. 2, which is a sectional view of FIG. 1 taken along line II—II, two first bearings 5a and 5b provided with V shaped grooves 4 in contact with a guide shaft 3 are fixed on the first travel assembly 1. Numeral 6 designates screws fixing the first bearings 5a and 5b to the first assembly 1. The distance between the bearings 5a and 5b is set to a proper value l1. From now on, l is defined as the bearing-to-bearing distance.

In FIG. 1, a bracket portion 1a extending downwardly is formed approximately in the center of the first travel assembly 1, and a flat spring 7 working as pressing means is fixed by screws 8 to the lower portion of the bracket portion 1a. The flat spring 7 provides projections 7a and 7b spaced by a distance approximately the same as the bearing-to-bearing distance l1 at both longitudinal ends, with the bracket portion 1a at the center, and rollers 9a and 9b working as second bearings are rotatably installed respectively on these projections.

The first bearings 5a and 5b and the rollers 9a and 9b are disposed opposite to each other across the guide shaft 3, and further the rollers 9a and 9b are properly pressed against the guide shaft 3 by the flat spring 7. As a result, the travel assembly 1 is slidably held between the first bearing 5a and the roller 9a, and further between the other first bearing 5b and the other roller 9b, namely being held slidably at the two points.

Figure 11:
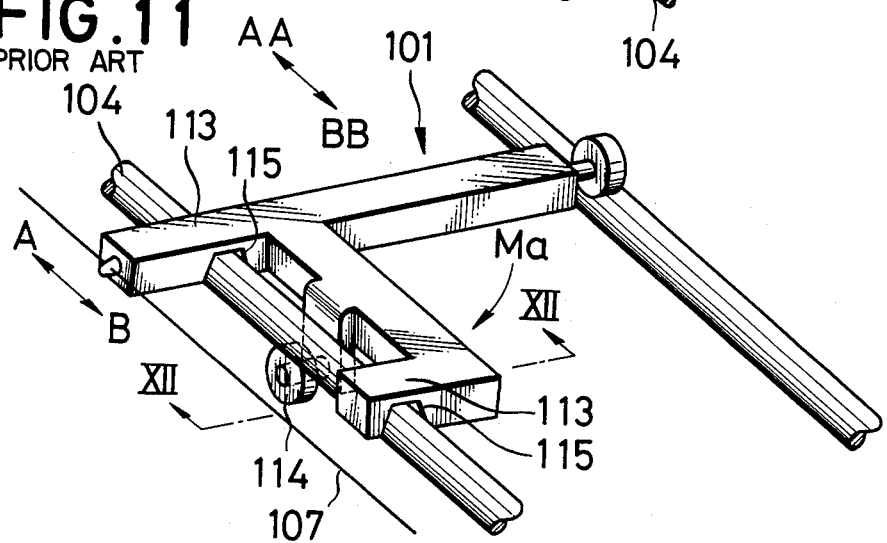
FIG. 11 is a perspective view showing a model of the example illustrated in FIG. 10.
Figure 12:
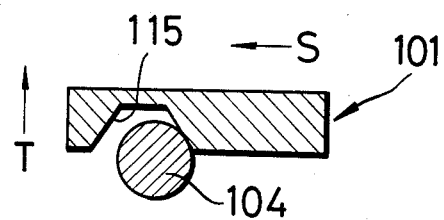
FIG. 12 is a cross section of FIG. 11 taken along line XII—XII.

As the first travel assembly 1 is supported in this manner on the guide shaft 3 by means of two sets of bearings facing each other, the first travel assembly 1 is kept from floating up from the guide shaft 3 by the action of the pressing force of the rollers 9a and 9b, and can run smoothly, even if a force couple acts thereon as described concerning FIGS. 11 and 12.

The force of the flat spring 7 is set to be just enough to prevent floating, because too strong a spring force causes too high a running resistance when the first travel assembly 1 moves in the direction of F. More specifically, the spring force should be just large enough to prevent the first travel assembly from being lifted, taking into account the design maximum couple (Ma; FIG. 11).

Figure 3:
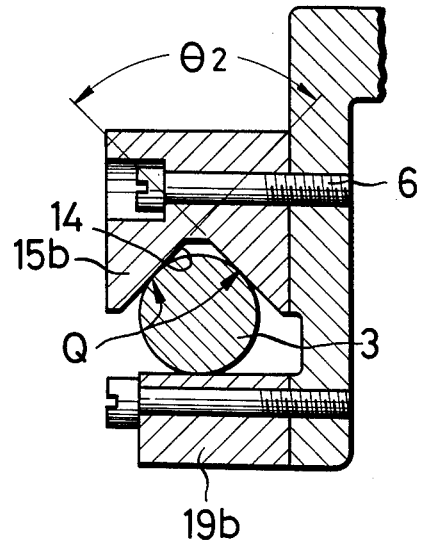
FIG. 3 is another sectional view of FIG. 1 taken along line III—III.

So far the description concerns the first embodiment according to the invention applied to the first travel assembly 1, and from now on it concerns the second embodiment according to the invention applied to the second travel assembly 2. In FIG. 1, the second travel assembly 2 is equipped with two first bearings 15a and 15b spaced by a bearing-to-bearing distance l2 longer than the bearing-to-bearing distance l1 for the first travel assembly 1. As shown in FIG. 3, the second embodiment is similar to the first embodiment in that the first bearing 15b (15a) has a V-shaped groove 14 in contact with the guide shaft 3 and is fixed by screws 6 to the second travel assembly 2. But, the difference between the first and second embodiments lies in that the second bearings placed opposite to the first bearings 15a and 15b across the guide shaft 3 are not rollers but sliding bearings 19a and 19b.

With the second bearings comprising the sliding bearings 19a and 19b, when a force couple (FIG. 11) acting on the travel assembly 2 is about to cause the second travel assembly 2 to lift up from the guide shaft 3, float-up of the travel assembly 2 is prevented as well, because the sliding bearings 19a and 19b come into contact with the guide shaft 3.

In addition, if the sliding bearings 19a and 19b are set too tightly against the guide shaft 3, the running resistance of the second travel assembly 2 can be too high, resulting in a failure to assure smooth running thereof. Therefore it is desirable that a proper gap be established between the sliding bearings 19a, 19b and the guide shaft 3. However, too large a gap may allow the second travel assembly 2 to lift. Experiments have revealed the most suitable gap to be about 0.02 to 0.05 mm.

The two embodiments described above have respective characteristics. Firstly, the first embodiment attached to the first travel assembly 1 is particularly useful for a short bearing-to-bearing distance l1. Generally, the extent of the lifting of the travel assembly is in inverse proportion to the bearing-to-bearing distance (e.g. l1 in FIG. 1). In other words, a short bearing-to-bearing distance allows the bearings to be easily lifted and the degree of the lifting is also large. Therefore, it is desirable that the gap between the second bearings (e.g. 9a and 9b in FIG. 1) and the guide shaft should be set as small as possible, and if possible, they should be in contact with each other, in order to prevent lifting. In the case of the first embodiment or with a short bearing-to-bearing distance, using the sliding bearings 19a and 19b as the second bearings as seen in the second embodiment is not practical because of the large running resistance as mentioned above. However, using the rollers 9a and 9b as the second bearings in the first embodiment can adequately suppress the lifting of the travel assembly with a minimum of running resistance.

Secondly, the second embodiment attached to the second travel assembly 2 is especially effective for a long bearing-to-bearing distance 12 and benefits from low cost. The aforesaid description shows that in general the result of longer bearing-to-bearing distance is that the bearings are hardly lifted and the degree of the lifting is small. So, in this case, contact of the second bearings (e.g. 19a and 19b in FIG. 1) and the guide shaft is not practically required. In this connection, using rollers for the second bearings as shown in the first embodiment, and placing of the flat spring 7 to press the rollers to the guide shaft could result in high cost, thus being undesirable.

So far, the angles $\theta_1$ and $\theta_2$ of the V shaped groove 4 (FIG. 2) in the first embodiment and the V shaped groove 14 (FIG. 3) in the second embodiment have not been explained. In the embodiment in FIG. 1, wherein the bearing-to-bearing distance 11 in the first embodiment is shorter than that 12 in the second embodiment, it is preferred that the angle $\theta_1$ of the groove in the first embodiment be smaller than that angle $\theta_2$ of the groove in the second embodiment. The order of 60° and 90° is employed respectively for $\theta_1$ and $\theta_2$.

The reason is as follows. As seen in FIG. 12, in the case of a small angle of the V shaped groove, it is harder to lift the slant face of the V shaped groove 115 from the guide shaft 104, even when a force couple acts on the travel assembly 101 in FIG. 11. So, it is desirable to keep the angle $\theta_1$ of the groove small in the first embodiment in which the short bearing-to-bearing distance tends to promote lifting of the travel assembly.

However, setting a small angle $\theta_1$ or $\theta_2$ of the groove of the first bearing results in more difficult machining and also in inaccurate dimensions of the travel assembly 1 or 2 in the vertical direction (the vertical direction in FIGS. 1 to 3). As a result, it is desirable to avoid setting the angles of the grooves of the first bearings smaller than needed.

As mentioned above, by changing the degree of the angle $\theta_1$ or $\theta_2$ of the first bearings 5a and 5b or 15a and 15b, according to the bearing-to-bearing distance 11 or 12, effective prevention of lifting can be properly obtained for respective cases. On the other hand, if the degree of the angle $\theta_1$ of the groove is set different from that $\theta_2$ of the groove, the positions P (in FIG. 2) on which the first bearings 5a and 5b are in contact with the guide shaft 3 in the first embodiment, and the positions Q (in FIG. 3) on which the first bearings 15a and 15b are in contact with the guide shaft 3 in the second embodiment, can be different from each other. This means that if the first bearings 5a and 5b for the first embodiment, and the first bearings 15a and 15b for the second embodiment happen to slide on the same guide shaft 3 at the same time, the sliding loci of the respective bearings result in different lines on the guide shaft 3. As a result, the guide shaft wears out less and has a longer service life in comparison with the case in which both of the different first bearings slide on the same line.

In FIGS. 7 and 1, the bearing-to-bearing distance 11 between the first bearings 5a and 5b supporting the first travel assembly 1 carrying the lamps 52 and the first mirror 53 and travelling a longer distance is set short (in the first embodiment), while the bearing-to-bearing distance 12 between the first bearings 15a and 15b supporting the second travel assembly 2 carrying the second and third mirrors 54 and 55 and travelling a shorter distance (the second embodiment) is set long, and further the first travel assembly 1 is placed within the end limits of the second travel assembly 2. The purpose is to make the overall width W of the device as short as possible in comparison with the length L of sub-scan of the original 51 in FIG. 7. Therefore, if there is no such dimensional restriction for the overall width W, it is possible to provide two pieces of the same first travel assemblies 1 and the same supports thereof (the first embodiment) on the same guide shaft in juxtaposition, as well as to attach the lamps 52 and the mirror 53 to one first travel assembly and the mirrors 54 and 55 to the other one.

In this case, assuming that the bearing-to-bearing distances of the supports for the both travel assemblies are set equal, it is desirable to preset different degrees of angles of V shaped grooves in both supports in order to extend the life of the guide shaft 3, as previously described.

Figure 4:
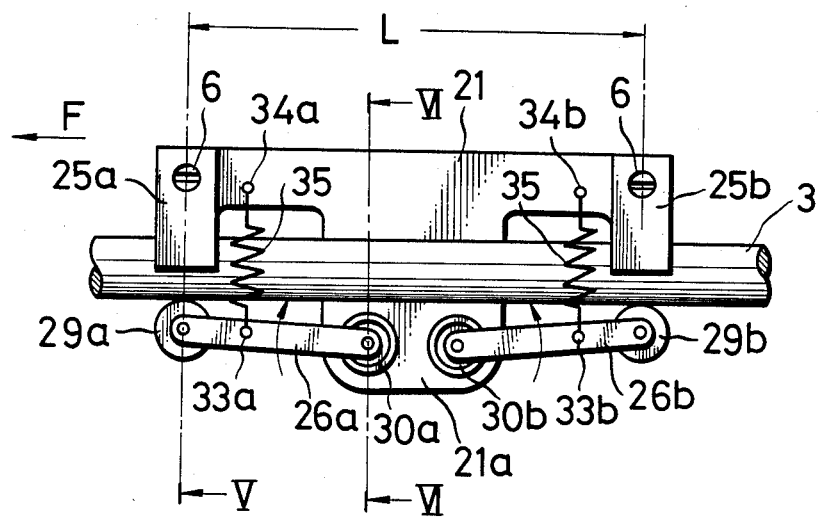
FIG. 4 is another side view which shows other embodiments according to the invention.

The following description concerns the third embodiment according to the invention, referring to FIG. 4. A travel assembly 21 shown in this figure can support one combination of the lamps 52 and the first mirror 53 or the other combination of the second and third mirrors 54 and 55 shown in FIG. 7. For example, the lamps 52 and the first mirror 53 are mounted on one travel assembly 21, and further the second and third mirrors 54 and 55 are mounted on the other travel assembly 21. The travel assemblies respectively can travel along the guide shaft 3 in the direction of F in FIG. 7. But, one travel assembly carrying the lamps 52 and the first mirror 53 moves twice as fast as the other travel assembly carrying the second and third mirrors 54 and 55. The direction F in FIG. 4 is identical to the direction shown by the like sign in FIG. 7.

Figure 5:
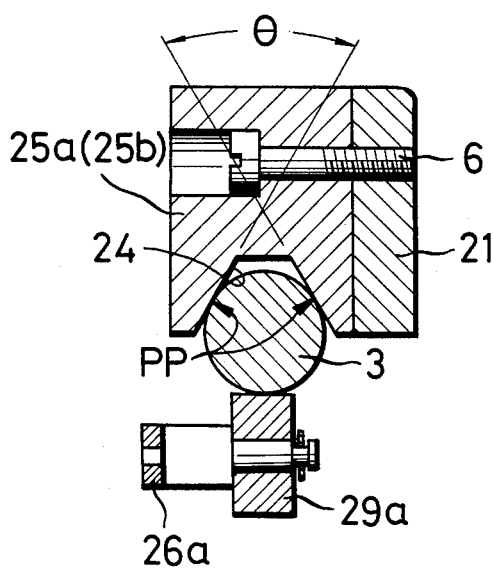
FIG. 5 is a sectional view of FIG. 4 taken along line V—V.

The travel assembly 21 has two bearings 25a and 25b spaced the distance L from each other which respectively are equipped with V shaped grooves 24 in contact with the guide shaft 3 at the points pp, as shown in FIG. 5.

Figure 6:
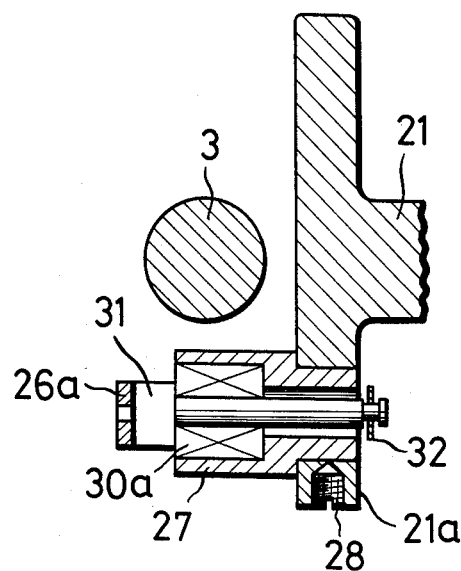
FIG. 6 is another sectional view of FIG. 4 taken along line VI—VI.

In FIG. 4, a bracket portion 21a extending downwardly at about the center of the travel assembly 21 is formed, and arms 26a and 26b are pivotally secured to the lower portions thereof. FIG. 6 shows in detail how the arms 26a and 26b are secured.

In FIG. 6, sleeves 27 are fixed into the bracket portion 21a by means of set screws 28, and a one-way clutch 30a is force-fitted into one sleeve 27. The arm 26a is secured on the left end of a clutch shaft 31 inserted through the one-way clutch 30a. At the right end of the clutch shaft 31, a set screw 32 fitted thereinto prevents the clutch shaft 31 from slipping out. In FIG. 4, the one-way clutch 30a permits the arm 26a to rotate clockwise but prevents the arm 26a from rotating counterclockwise.

FIG. 6 shows mainly the arms 26a at the left side in FIG. 4, the other arm 26b, at the right side is secured similarly. However, the one-way clutch 30b for the arm 26b works differently—the one-way clutch 30b permits the arm 26b at the right side to rotate counterclockwise but prevents it from rotating clockwise.

At the other ends of the right and left arms 26a and 26b, rollers 29a and 29b, such as antifriction bearings, ball bearing or other bearings, are rotatably supported opposite the bearings 25a and 25b across the guide shaft 3. Tension springs 35 working as elastic means are engaged between pins 33a and 33b fixed to the right and left arms 26a and 26b, and pins 34a and 34b secured to the travel assembly 21. As mentioned above, the left arm 26a is designed to rotate only clockwise, and the right arm 26b only counterclockwise, so that the left arm 26a is given the clockwise rotation tendency, and the right arm 26b the counterclockwise rotation tendency by the positive action of the tension springs 35. These rotation tendencies work in such directions that both the rollers 29a and 29b swing respectively toward the mating bearings 25a and 26b, and cause the right and left rollers 29a and 29b to get into close contact with the guide shaft 3 by the force of the springs 35.

As a result, the travel assembly 21 moves on the guide shaft while being held between two sets of the bearing 25a and the roller 29a, as well as the bearing 25b and the roller 29b, which are respectively opposite each other across the guide shaft 3. While the travel assembly 21 is running, the running resistance is remarkably reduced thanks to the rotation of the both rollers 29a and 29b. Too strong a force of the springs 35, however, is not desirable, because too excessive a force of the rollers in pressing against the guide shaft 3 induces too large a running resistance, resulting in difficulties. So, the force of the springs 35 should be set to a proper degree just enough to keep the running resistance low as well as to effectively prevent lifting of the travel assembly 21.

When a force couple acts on the travel assembly 21 (Ma in FIG. 11), the travel assembly 21 tends to lift itself from the guide shaft 3 upwardly, as described referring to FIG. 12. Simultaneously, each of the rollers 29a and 29b is relatively moved downwardly in FIG. 4 by means of the guide shaft 3, which results in the left arm 26a (holding the roller 29a) being pushed counterclockwise while the right arm 26b (holding the roller 29b) is being pushed clockwise.

The arms, however, have no possibility of rotating in the directions in which they are pushed because the left arm 26a is prevented from rotating counterclockwise by the one-way clutch 30a, and the right arm 26b from rotating clockwise by the one-way clutch 30b as already mentioned above. In other words, even if a lifting force acts on the travel assembly 21 the assembly cannot be lifted from the guide shaft 3 because of these preventive measures. Thus, the travel assembly 21 is both kept from lifting and is allowed to run smoothly.

Even if the guide shaft 3 and the bearings 25a and 25b wear from long use, the travel assembly 21 is still kept from lifting because continued contact of the guide shaft 3 and the rollers 29a and 29b is ensured by the springs 35.

Additionally, in determining the angle $\theta$ of the groove (FIG. 5), the same consideration apply as in determining the angles $\theta_1$ and $\theta_2$ in FIG. 2. In other words, the groove angle $\theta$ should not be set unnecessarily small only with the prevention of the lifting of the travel assembly 21 in mind, but reasonably set on the basis of the bearing-to-bearing distance and other factors. In addition to the bearing-to-bearing distance, the weight, the running speed and the running characteristics (the so-called allowable value of jitters) of the travel assembly 21 should be taken into consideration.

According to the inventor's experiments, the angle of 40° to 90° is optimum for effective prevention of lifting of the travel assembly 21 and also for keeping the running resistance small. More particularly, the angle $\theta$ of 70° to 90° is ideal for a long bearing-to-bearing distance, and the angle $\theta$ of 40° to 60° for a short bearing-to-bearing distance.

It will be clear to those skilled in the art that various changes may be made in the invention without departing from the spirit and scope thereof and therefore the invention is not limited by that which is shown in the drawings and described in the specification but only as indicated in the appended claims.

What is claimed is:

1. A support device for supporting on a guide shaft a travel assembly moving along said guide shaft, comprising:
   (a) at least two slide bearings equipped with V-shape grooves, fixed to said travel assembly and being in contact with said guide shaft so as to slidably move on said guide shaft; and
   (b) rollers respectively disposed opposite said bearings across said guide shaft;
   (c) arms supported on said travel assembly and supporting said rollers;
   (d) one-way clutches coupling said arms and said travel assembly to permit the arms to rotate only in the direction in which they move the rollers toward the respective slide bearings; and
   (e) elastic means biasing said rollers toward and into contact with said guide shaft, with relatively small elastic biasing force.

2. A device as in claim 1, in which the angle of said V-shaped grooves is in the range of from about 40° to about 90°.

3. A device as in claim 1, in which the device supports at least two travel assemblies on the same guide shaft and has at least two of said slide bearings per travel assembly, wherein the groove angles of the slide bearings differ as between travel assemblies.

* * * * *